(12) United States Patent
Bradley

(10) Patent No.: US 9,456,356 B2
(45) Date of Patent: Sep. 27, 2016

(54) METHODS FOR SYNCHRONIZING DATA IN A NETWORK

(75) Inventor: Bob Bradley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1240 days.

(21) Appl. No.: 12/579,922

(22) Filed: Oct. 15, 2009

(65) Prior Publication Data

US 2011/0090896 A1    Apr. 21, 2011

(51) Int. Cl.
*H04W 24/02*    (2009.01)
*H04W 92/20*    (2009.01)

(52) U.S. Cl.
CPC ............ *H04W 24/02* (2013.01); *H04W 92/20* (2013.01)

(58) Field of Classification Search
None
See application file for complete search history.

(56) References Cited

U.S. PATENT DOCUMENTS

| | | |
|---|---|---|
| 5,327,425 A | 7/1994 | Niwa et al. |
| 5,734,642 A | 3/1998 | Vaishnavi et al. |
| 6,185,287 B1 | 2/2001 | Miloslavsky |
| 6,594,284 B1 | 7/2003 | Page et al. |
| 6,636,982 B1 * | 10/2003 | Rowlands ...................... 714/4.1 |
| 6,765,917 B1 | 7/2004 | Jaakkola et al. |
| 2003/0217289 A1 * | 11/2003 | Ammon et al. .............. 713/201 |
| 2004/0242228 A1 * | 12/2004 | Lee ........................ H04L 63/062  455/432.1 |
| 2009/0028118 A1 * | 1/2009 | Gray et al. ..................... 370/338 |
| 2010/0162036 A1 * | 6/2010 | Linden et al. ..................... 714/4 |
| 2010/0178872 A1 * | 7/2010 | Alrabady et al. ............ 455/41.3 |

OTHER PUBLICATIONS

"Universally Unique Identifier" [online]. Wikipedia., [retrieved on Oct. 15, 2009]: <URL: http://en.wikipedia.org/wiki/UUID>.
"Wi-Fi Protected Setup" [online]. Wikipedia., [retrieved on Oct. 15, 2009]:   <URL:   http://en.wikipedia.org/wiki/Wi-Fi_Protected_Setup>.
"Bonjour (software)" [online]. Wikipedia., [retrieved on Oct. 15, 2009]: <URL: http://en.wikipedia.org/wiki/Bonjour_(software)>.
"Zero configuration networking" [online]. Wikipedia., [retrieved on Oct. 15, 2009]: <URL: http://en.wikipedia.org/wiki/Zero_configuration>.

* cited by examiner

*Primary Examiner* — Jackie Zuniga Abad
(74) *Attorney, Agent, or Firm* — Sterne, Kessler, Goldstein & Fox PLLC

(57) ABSTRACT

A wireless network may contain access points that run a network management service. The service may monitor the access points and associated wireless access control settings. Wireless access control settings may be changed by a user to add or remote authorized client devices. The network management service may automatically detect changes to the network and may synchronize settings between access points accordingly. Each access point may broadcast a service name. The service name may include a wireless access point participant identifier, a cloud identifier that is based on a service set identifier, and a commit identifier that is based on a hash of the wireless access control settings for the broadcasting wireless access point. Cloud identifiers can be compared to identify whether a new access point should be synchronized. Participant identifiers may be compared to identify leaders. Commit identifiers can be compared to detect changes in wireless settings.

34 Claims, 6 Drawing Sheets

METHODS FOR SYNCHRONIZING DATA IN A NETWORK

BACKGROUND

This invention relates to networks, and more particularly, to wireless networks.

Networks are groups of computers or other electronic devices that are interconnected in a way that allows information to be shared among the devices. The computers and electronic devices may be connected using physical wiring (e.g., Ethernet technology for local area networks (LAN)). The computers and electronic devices in a network may also communicate with each other using wireless communications technology. Wireless networks that implement wireless communications technology often include access points. Access points are devices that allow wireless communication devices to connect to a wireless network. In a typical configuration, an access point supports wireless connectively using IEEE 802.11 networking protocols (sometimes referred to as Wi-Fi®).

Access points have a limited range of coverage. For example, an access point may be capable of providing wireless access to devices that are located within a 50 meter (m) radius. A client device may initially be located within the 50 m radius. A user may move the device while maintaining wireless connectively, provided that the device is not moved more than 50 m from the access point. A user that moves the client device farther than 50 m from the access point will lose wireless connectivity.

Multiple access points may be used to increase the coverage area in a wireless network. For example, a user may wish to establish a wireless network throughout a large home. Even if an access point is installed in a central location, wireless coverage may be weak or non-existent in certain locations within the home. Two access points may therefore be needed to provide satisfactory wireless coverage for the entire home. A first access point (e.g., an access point with a built-in router) may be connected to a cable modem or other Internet connection via Ethernet cabling and may be placed near one end of the home. A second access point may be placed near another end of the home. This type of arrangement may allow a user to access the wireless network at all locations within the home. In some portions of the home, network connectivity may be provided by the first access point. In other portions of the home, wireless signal strength for the first access point may be weak, but network connectively may be provided by the second access point.

Access points often support multiple communications bands, each of which may be provided with a unique service set identifier (SSID). For example, an access point may be assigned an SSID of NTW24 for the 2.4 GHz WiFi band and an SSID of NTW5 for the 5 GHz band. In networks with a number of different access points, different bands and access points may be assigned a variety of overlapping and distinct SSIDs. Each portion of a network that shares a common SSID is sometimes referred to as forming a distinct "cloud" within the network.

Access points and client devices may use cryptographic keys to ensure security in a wireless network. For example, an access point in a network may provide authorized client devices with unique keys. The keys can be used in determining whether a given client device should be permitted to access the network.

Although the use of cryptographic keys helps prevent unauthorized network access, difficulties can arise in networks that include multiple access points. This is because the process of establishing the authorization of a particular client device to access one access point does not generally result in the automatic establishment of a similar authorization at other access points in the same network. As a result, a client device may be able to access the network at one part of a user's home, but not in another. Although each access point in a network could potentially be configured separately, networks with fluid populations of client devices and access points can be difficult to manage effectively. Such management tasks can be particularly burdensome for a home user who wants a network to be simple to maintain.

It would therefore be desirable to be able to provide improved techniques for coordinating settings between access points in a wireless network.

SUMMARY

A wireless network may contain a time-varying number of wireless access points. The wireless access points may include storage and processing circuitry that runs a network management service. Using the network management service, each wireless access point may broadcast a service name. The service name may include a cloud identifier that is based on a service set identifier associated with the wireless access point. When a new access point comes within range of a wireless local area network, wireless access points in the network can compare the cloud identifier of the new wireless access point to the cloud identifiers of existing network participants to determine whether to synchronize wireless access control settings.

The service name that is broadcast by each access point may also include a wireless access point participant identifier. During synchronization operations, the wireless access point participant identifiers of all of the synchronizing wireless access points may be compared. The lowest participant identifier value may identify an access point as a leader. During subsequent operations, changes to wireless access control settings may be synchronized by first uploading these changes to the leader.

Commit identifiers may be computed by applying a hash to the wireless access control settings of each access point. The commit identifiers may be broadcast as part of the service name information that is broadcast by each wireless access point. Changes between access points that require synchronization may be detected by comparing commit identifiers. If the commit identifiers of two access points match, the wireless access control settings of the two access points are the same and no synchronization is required. If the commit identifiers differ, settings can be synchronized (e.g., by pushing them to the rest of the access points by way of the leader).

Further features of the wireless network, its nature and various advantages will be more apparent from the accompanying drawings and the following detailed description.

DETAILED DESCRIPTION

Electronic devices such as computers, handheld devices, media players, printers, and other equipment may be connected to form a network. Networks allow devices within the same network to communicate with each other and to share resources and information.

For example, a personal area network (PAN) may be used for communication among devices that are located close to a single user. Devices that may be interconnected in a PAN may include personal computers, printers, fax machines, telephones, media players, and other personal computing devices. On the other hand, a wide area network (WAN) may be used to cover a relatively broad geographic area. A WAN may connect governmental, academic, public, and private networks that are located in different geographic regions. A WAN may connect these different networks using communication links that cross metropolitan, regional, or national boundaries (e.g., one city to another city or one country to another country). The Internet is often cited as an example of a popular WAN.

Local area networks (LAN) are generally used to cover smaller physical areas. A typical LAN covers more area than a personal area network and less area than a wide area network. A LAN may be used to connect computing devices within a home, an office, an airport, small groups of buildings, etc. Computing devices within a LAN may be connected using physical wiring. Wired LANs are often based on Ethernet technology. The computing devices in a wired LAN may be physically connected to network devices such as hubs, switches, bridges and/or routers. The computing devices may be wired to the network devices using category 5 (Cat5) cables, for example.

The computing devices in a LAN may communicate wirelessly (e.g., by transmitting and receiving information using wireless communications technology). A wireless LAN may be implemented using various communications protocols. These typically include IEEE (Institute of Electrical and Electronics Engineers) standards such as 802.11*b*, 802.11*a*, 802.11*g*, and 802.11*n*, but other standards may be used if desired.

Figure 1:
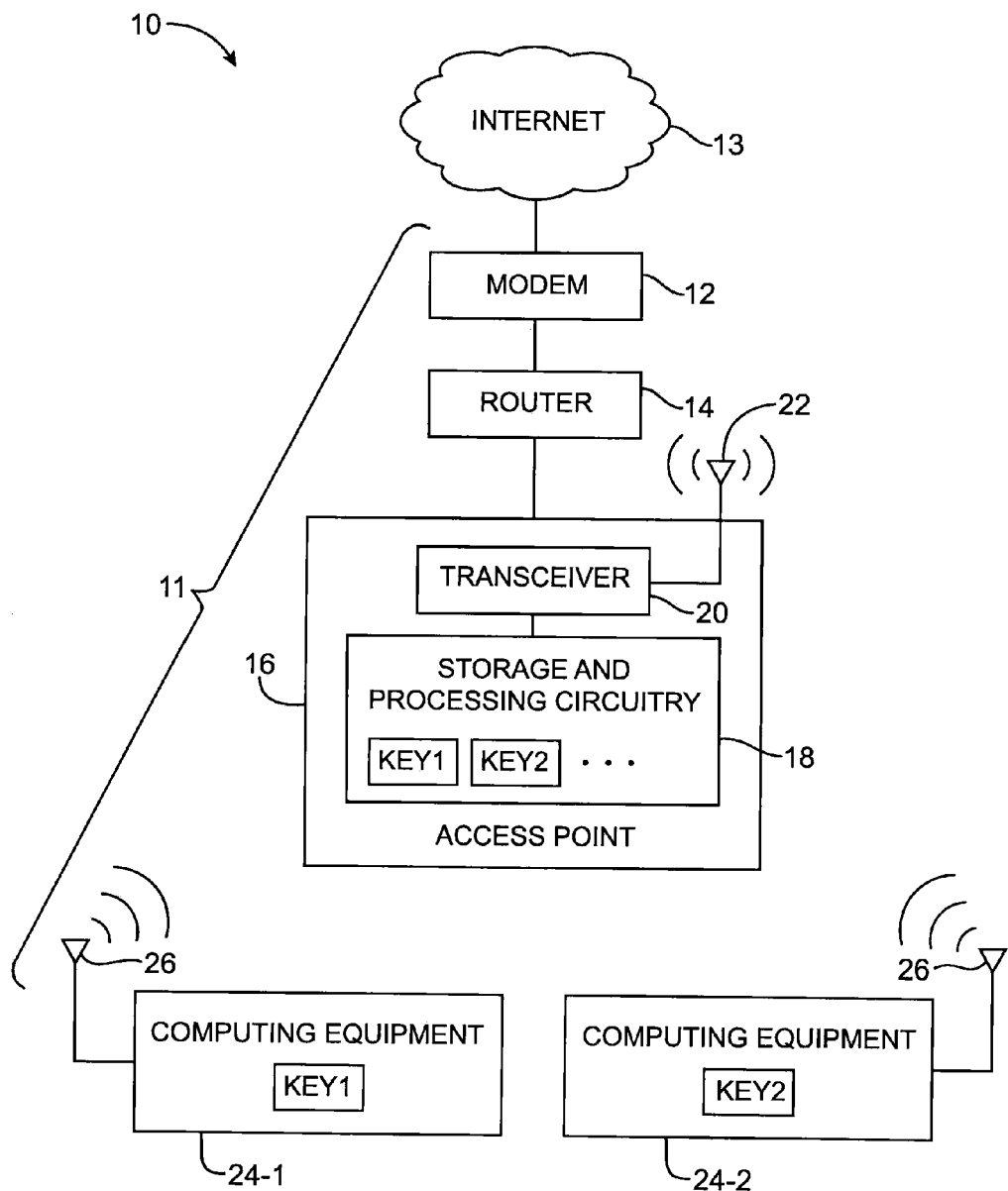
FIG. 1 is a schematic diagram of an illustrative wireless network in accordance with an embodiment of the present invention.

A setup for an illustrative wireless LAN (WLAN) is shown in the system of FIG. 1. As shown in FIG. 1, system 10 may include local area network 11 and Internet 13. A modem such as modem 12 may be used to connect local area network 11 to the Internet. Modem 12 may be connected to a router such as router 14. Router 14 serves as a gateway between Internet 13 and local area network 11. Router 14 may have multiple ports. Computing equipment such as personal computers, printers, and other electronic devices may be directly connected to the ports of router 14, if desired. Computing devices that are directly connected to the ports of router 14 form part of local area network 11 and may be provided with access to the Internet.

Wireless connectivity may be provided using one or more wireless access points such as wireless access point 16. If desired, router 14 may be combined with a wireless access point (i.e., access point 16 may be provided with integral router capabilities). In the example of FIG. 1, router 14 and access point 16 are shown as being implemented as separate pieces of equipment. This is, however, merely illustrative.

Access point 16 may support wireless network communications using any suitable wireless protocols (e.g., IEEE 802.11 protocols such as the protocols that are sometimes referred to as WiFi® protocols). Access point 16 includes storage and processing circuitry 18. Storage and processing circuitry 18 may include memory that can be used to store information. This memory typically includes volatile and nonvolatile memory circuits. Processing circuits within circuitry 18 may be based on microprocessors, digital signal processing chips, application-specific integrated circuits, and other circuitry that can process transmitted and received data and handle control functions. Among other tasks, storage and processing circuitry 18 may store cryptographic keys used for regulating network access (e.g., KEY1, KEY2, . . . ). Only devices that have an appropriate key will be permitted to access the network.

In a network with a single access point, the list of keys that is maintained in the access point may be used to define a population of authorized client devices. In a network with multiple access points, each access point may potentially have a unique set of keys.

Access point 16 may have transceiver circuitry such as transceiver 20 that is connected to storage and processing circuitry 18. Transceiver 20 includes circuits for radio-frequency communications (i.e., operations associated with wirelessly transmitting and receiving data in network 11). Transceiver 20 may include power amplifiers, low noise amplifiers, oscillators, mixers, matching circuits, digital-to-analog converters, analog-to-digital converters, etc.

Transceiver 20 may be connected to an antenna such as antenna 22. More than one antenna may be used, if desired. Antenna 22 may be used to transmit wireless information and to receive incoming wireless signals.

Access point 16 may use antenna 22 to communicate wirelessly with computing equipment such as computing equipment 24-1 and 24-2. The computing equipment may have antennas such as antennas 26 that are used to communicate with antenna 22 of access point 16.

Computing equipment such as computing equipment 24-1 and 24-2 may include portable computers, handheld wireless devices, gaming devices, consumer electronics equipment, peripherals such as printers, etc. This equipment is sometimes referred to herein as wireless devices or wireless client devices.

When a wireless client device is active within network 11, a service discovery protocol may be used to allow the client device to discover and request access to wireless network 11. Service discovery and other network management functions may, for example, be implemented using the Wi-Fi® Protected Setup (WPS) protocol. The WPS protocol allows wireless local area networks to be set up using a personal-identification number (PIN) mode or a push-button mode. Other types of network setup schemes may be used in network 11 if desired. The use of WPS-compliant techniques is merely illustrative.

The service discovery protocol may implement zero configuration networking functionality. Zero configuration networking techniques may be used to automatically connect a client device to an existing network without manual intervention of the user. Zero configuration networking may allow users to connect personal computers, printers, and other network devices to network 11 automatically.

When the wireless capabilities of a client device are enabled, the service discovery protocol may be used to perform wireless scans to detect a list of networks that support the same protocol. Once the client device (i.e., an enrollee) detects a network that it wants to join, the client device can send a join request to the network. To add the new client device to the network, an authorized user may simply enter a personal identification number (PIN) that is associated with the enrollee and then click "Authorize." The PIN may be obtained from a sticker of a new wireless client device. The use of this type of PIN mode may protect against man-in-the-middle attacks because an attacker would need to know the PIN of the client device to establish a secure connection. In push-button mode, a user may push a button or click on a button-like on-screen option on the access point and the new wireless client device. Push-button mode may not be as secure as PIN mode, because push-button mode does not require authentication.

Once a new client device has been authorized to use an access point, the access point may activate an appropriate a WPS mode to establish a temporary secure tunnel between the access point and the client device. The enrollee may then engage in a WPS registration process with the access point. The WPS registration process may fail if an incorrect PIN has been entered, for example. If the process fails, the service discovery protocol may notify the user of the reason for failure. The user may re-enter the PIN or try connecting again. If the WPS registration process is successful, the service discovery protocol reports a successful join to the user, and the enrollee is now connected to the network. In the event of a successful join, the access point may provide the new client device with a unique (per-client) network access key for use in authorizing subsequent network access.

As an example, computing equipment 24-1 may negotiate with access point 16 to obtain a key such as KEY1 from access point 16 when it joins the wireless network. Likewise, computing equipment 24-2 may negotiate to obtain a key such as KEY2 from access point 16. When a device presents an authorized key (i.e., KEY1 or KEY2 in this example), network access will be permitted. Devices that cannot present an authorized key will not be able to connect to the wireless network. Because a device may only be connected wirelessly to an access point if the device has previously obtained a key from the access point, the key is sometimes referred to as a "pre-shared key" (PSK).

As a user's needs change over time, a user may add or remove access points from a wireless network. For example, if a user wishes to expand coverage to a particular portion of a home, the user may add an access point to the user's home network. If a user moves a network to a more confined location, extra access points may no longer be needed, so access points can be removed from the network.

Figure 2:
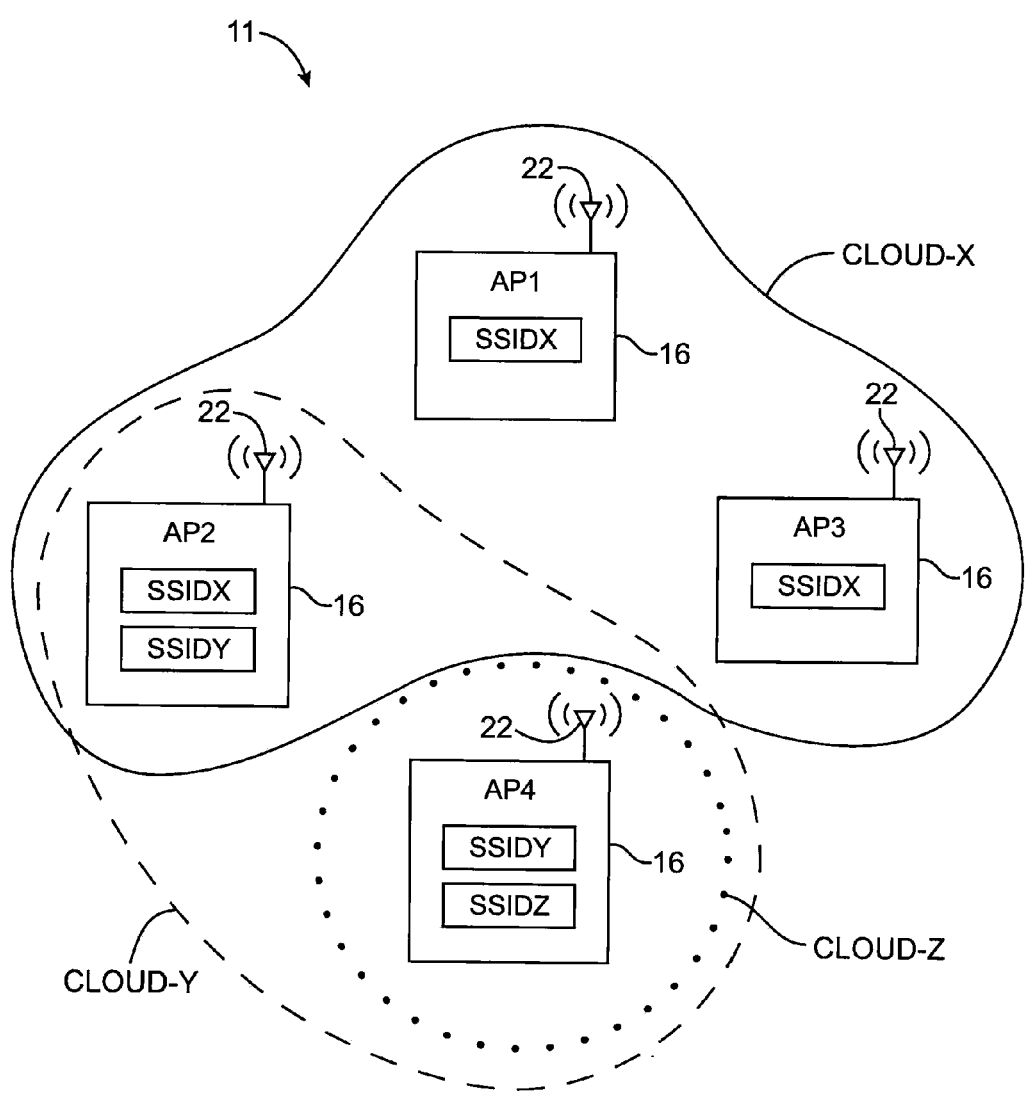
FIG. 2 is a diagram showing different illustrative clouds in a network in accordance with an embodiment of the present invention.

A wireless network with multiple access points may have two access points, three access points, or more than three access points. FIG. 2 shows an example in which wireless local area network 11 includes four access points 16. The access points may each wirelessly broadcast information to announce its presence and advertise its capabilities in the network. In the arrangement of FIG. 2, four access points 16 are located sufficiently close to each other that each access point can recognize the existence of the other three access points (e.g., the service discovery protocol of each access point can detect the presence of the other access points). The information that each access broadcasts may take the form of a service name (as an example). The service name that each access point broadcasts may include a cloud ID and a participant ID (as an example).

The cloud ID may be a service set identifier (SSID). The cloud ID may be used to identify the members of a particular portion of the network (i.e., a particular "cloud" within network 11. In the example of FIG. 2, AP1 and AP3 each have a single SSID (i.e., SSIDX). Access points AP2 and AP4 have multiple SSIDS. Access point AP2 has SSIDs of SSIDX and SSIDY. Access point AP4 has SSIDs of SSIDY and SSIDZ. Access points that share the same SSID are said to form part of the same network cloud. In this example, AP1, AP2, and AP3 belong to CLOUD-X because they each have the same cloud ID of SSIDX. Similarly, AP2 and AP4 belong to CLOUD-Y because they both share a common cloud ID of SSIDY. AP4 forms its own cloud (CLOUD-Z) because no other access point has a cloud ID of SSIDZ. As this example demonstrates, cloud membership is not mutually exclusive. For example, access point AP2 may be a member of both CLOUD-X and CLOUD-Y.

A client device that comes within range of wireless network 11 may join a particular cloud (i.e., by using its SSID in joining the network). Consider a scenario in which a client device wishes to join the network by forming a wireless connection with access point AP2 using SSIDX (CLOUD-X). During setup operations, the client device may obtain key PSK from AP2. The key may initially only be associated with AP2.

With conventional networks, the client device may lose connectivity if the client device moves out of range of AP2 and into the range of AP1. This is because the key from AP2 will not generally be recognized by AP1. The client device may therefore lose connectivity even if AP1 and AP2 belong to the same cloud (i.e., CLOUD-X). This type of behavior can be frustrating to a user who is managing the network.

It would therefore be desirable to be able ensure that all of the access points in the network cooperate with each other. Access points may, for example, automatically synchronize settings. In this way, each access point may be provided with a synchronized list of all appropriate enrollees.

With one suitable arrangement, each and every access point in the same cloud may be automatically provided with the keys (the PSKs) of every enrollee within the cloud. A wireless network that is configured in this way can allow client devices to roam within a cloud without losing wireless connectivity. Because the synchronization process is automatic, it is not necessary for devices to use pushbutton mode or PIN mode enrollment procedures to connect to new access points in a cloud. Enrollment with a single access point in the cloud can suffice.

Synchronization operations can be performed using a service running on the storage and processing circuitry of each participating access point. To support automatic synchronization operations, each access point may broadcast information about its settings. For example, each access point that is a participant in a network may broadcast a service name in the form of a packet that can be wirelessly received by other access points. Information that may be included in the broadcast information (e.g., in the service name) includes a participant ID, a cloud ID, a network management service version number (allowing actions by new versions of the service to be ignored by older versions), and a commit identifier (ID). A user-friendly participant name for the access point may also be broadcast as part of this information. The participant name is optional and may only function as an informative label.

Each access point may have a text (TXT) record that includes the commit ID, the participant name, and the version number. The commit ID is a number that represents the current wireless access control settings of the participant (access point). The commit ID of a participant may, for example, be generated by applying a hash function to the wireless access control settings for that participant.

The cloud ID and the participant ID may each be broadcast by the access points in the form of a universally unique identifier (UUID). The use of UUIDs may enable a network such as network 11 to uniquely identify multiple access points without central coordination and without needing to resolve name conflicts. For example, the participant ID may be converted to a participant UUID using a name-based hash function. The hash function may be a function of an access point's media access control (MAC) address, serial number, and any other data that uniquely identifies the access point. The version number published in the TXT record can be used primarily to check that the same hash function is being used between the communicating devices. If different versions of the hash function are detected, the communicating access points may not be joined. A cloud UUID may be generated from the cloud ID using a similar hash function (i.e., by hashing the SSID for the cloud).

Each cloud may have an access point that serves as its leader. A global rule may be used to automatically establish which access point among a group of access points should be considered the leader. As an example, the rule may dictate that the access point participant in a particular cloud with the smallest participant ID will be the leader of the cloud. Leadership status can change as participants join or leave the cloud (e.g., by powering access points on or off). When a new participant is powered on or otherwise comes in wireless range of the network and is detected by the existing participants, the existing participants will compare the participant ID of the new participant. If the participant ID of the new participant is less than the participant ID of the current leader, then the new participant will become the new leader of the cloud. If the participant ID of the new participant is greater than the participant ID of the current leader, then the new participant will join as a non-leader participant. The cloud may keep a list that orders the participants according to the numeric value of their participant IDs (e.g., the smallest numeric value being the leader, the next smallest numeric value being the immediate successor to the leader, etc.).

Figure 3:
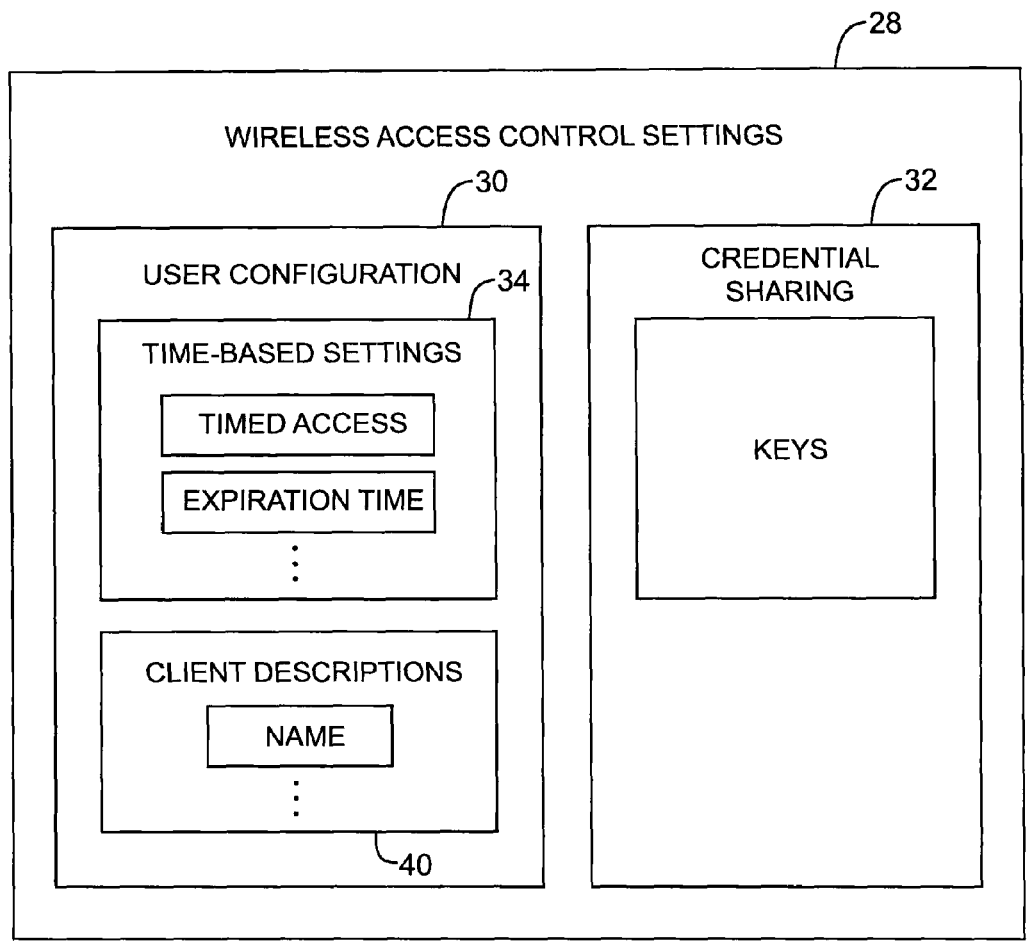
FIG. 3 is a diagram showing wireless access control settings that may be associated with an access point in accordance with an embodiment of the present invention.

Each participant (i.e., access point) within a cloud may request changes to its wireless access control settings. FIG. 3 is a diagram that shows wireless access control settings 28 that can be changed by an authorized user. As shown in FIG. 3, wireless access control settings 28 may include user configuration settings 30 and credential sharing settings 32. Configuration and credential sharing data may change as a function of time. Typical changes include "sets" (additions) and "removes" (deletions). Changes may also result from "reset" operations. User configuration changes can include changes that are performed explicitly by an authorized user. For example, a user may delete a client from the list of enrollees to revoke the client's access to the Internet. Similarly, a user may add a new client to the wireless access point. User configuration changes may include time-based settings 34 and client descriptions 40.

Time-based settings 34 may include timed access settings and expiration time settings. For example, a user may impose restrictions on a particular client so that that client only has Internet access on weekdays between 9 a.m. and 5 p.m. (an example of a timed access setting). A user may also permit a particular client to have Internet access up until an ultimate expiration date of Jan. 1, 2010 (an example of an expiration time setting). Likewise, a user may manually change the name or any label associated with a particular client (an example of a change to client description information 40).

Credential sharing settings 32 include implicit changes made when a client joins a network. Credential sharing refers to the process of negotiating keys with new clients and sharing the keys among the different participants that are in the same cloud. For example, when a new client wants to become an enrollee to a particular access point, the access point may generate a specific key for the new client. The specific key may then be distributed to the other access points in the cloud using the synchronization process. If desired, a client may be assigned multiple keys so that the client can connect to multiple clouds.

Figure 4:
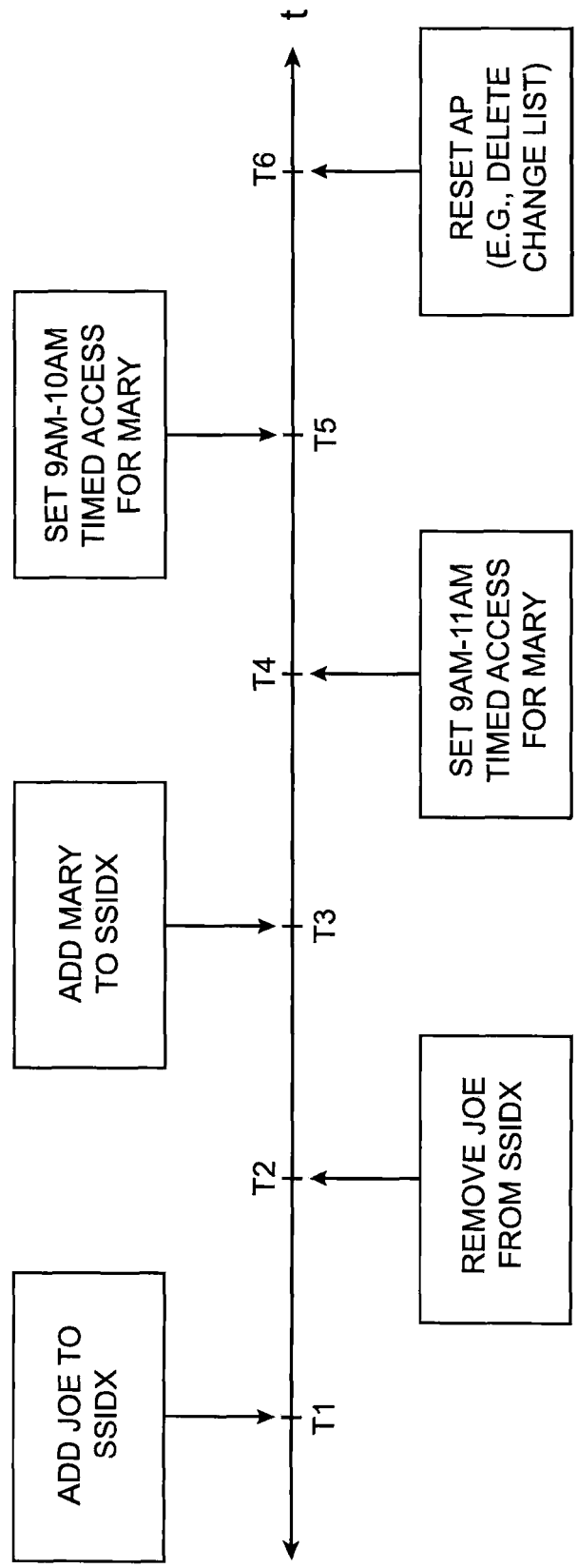
FIG. 4 is a timeline showing an illustrative sequence of events that may arise when changing settings for an access point in a network in accordance with an embodiment of the present invention.

Consider a first scenario in which there is only one access point maintained by a user. FIG. 4 is a timeline showing an illustrative sequence of changes that might be applied to this access point. At T1, the user may add Joe (i.e., Joe's client device) as an authorized device for SSIDX. At T2, the user may delete Joe from SSIDX. Joe may receive Internet access from T1 to T2 in this scenario. After T2, Joe is no longer an authorized user for CLOUD-X. At T3, the user may add Mary to SSIDY. At T4, the user may supply the access point with settings that provide Mary with limited Internet access (e.g., 9 a.m. to 11 a.m. timed access). At T5, the user may set an updated timed access for Mary (e.g., 9 a.m. to 10 a.m.). In this example, Mary would have unlimited time access from T3 to T4, limited timed access of 9 a.m. to 11 a.m. from T4 to T5, and limited timed access of 9 a.m. to 10 a.m. for time greater than T5. The change in Mary's user configuration at T5 may override the changes applied at T4 because the change at T5 is more recent than the change made at T4. In arrangements such as this illustrative single-access-point arrangement, it is not necessary to synchronize the settings changes for Joe and Mary with other access points, because no other access points are participating in the wireless network. However, in network environments in which the population of access points can change as a function of time, automatic synchronization of access point settings can be used to ensure seamless network operation.

Each access point in a set of multiple access points may maintain a change list that keeps track of all the wireless access control settings and the changes that were made to the wireless access control settings for that access point. For example, the change list can record each event of the type shown on the illustrative timeline of FIG. 4. The change list may tag entries with time data. For example, change list entries may include a coordinated universal time (UTC) timestamp to each change that is made to the wireless access control settings (e.g., the changes are recorded in chronological order). Timestamp information may be used to resolve conflicts. For example, the change with the most recent timestamp can be used as the change that is to be applied to an access point or a group of access points in a cloud. In the first scenario described above, the user removed Joe after adding Joe, so the latest change (i.e., the deletion of Joe) reflects the current state of the access point (e.g., Joe is no longer connected to the network). This state may be reflected in a later timestamp for the deletion of Joe in the change list.

A change list may be stored in the form of an internal property list ("plist"). Property lists may be suitable for storing small amounts of persistent information (e.g., in sizes that are typically less than a megabyte). Property lists may offer a uniform and architecture-independent means of organizing, storing, and accessing data for an access point that belongs to a larger network.

A change list can be used to differentiate between a client that has been deleted versus and a client that was never present to begin with. For example, in the first scenario described above, the change list may record the addition of Joe at T1 and the deletion of Joe at T2. Joe is effectively deleted from the access point for times greater than T2. Even though Joe no longer has wireless access, the access point will know that Joe was once added. Without a change list of this type, the access point would have no information indicating whether Joe had ever been added to the network.

As shown in the illustrative timeline of FIG. 4, the user may reset the access point at time T6. Resetting the access point may clear the change list. Because a reset deletes the change list, the access point will no longer have any previous record of any event that occurred prior to the reset (e.g., the access point will have no history of previously applied settings). Access point settings may be changed in this way using any suitable communications scheme (e.g., over a wireless link between the user's client device and the access point, using an Ethernet cable between the user's client device and the access point, using buttons or other user interface controls on the access point, etc.).

Figure 5:
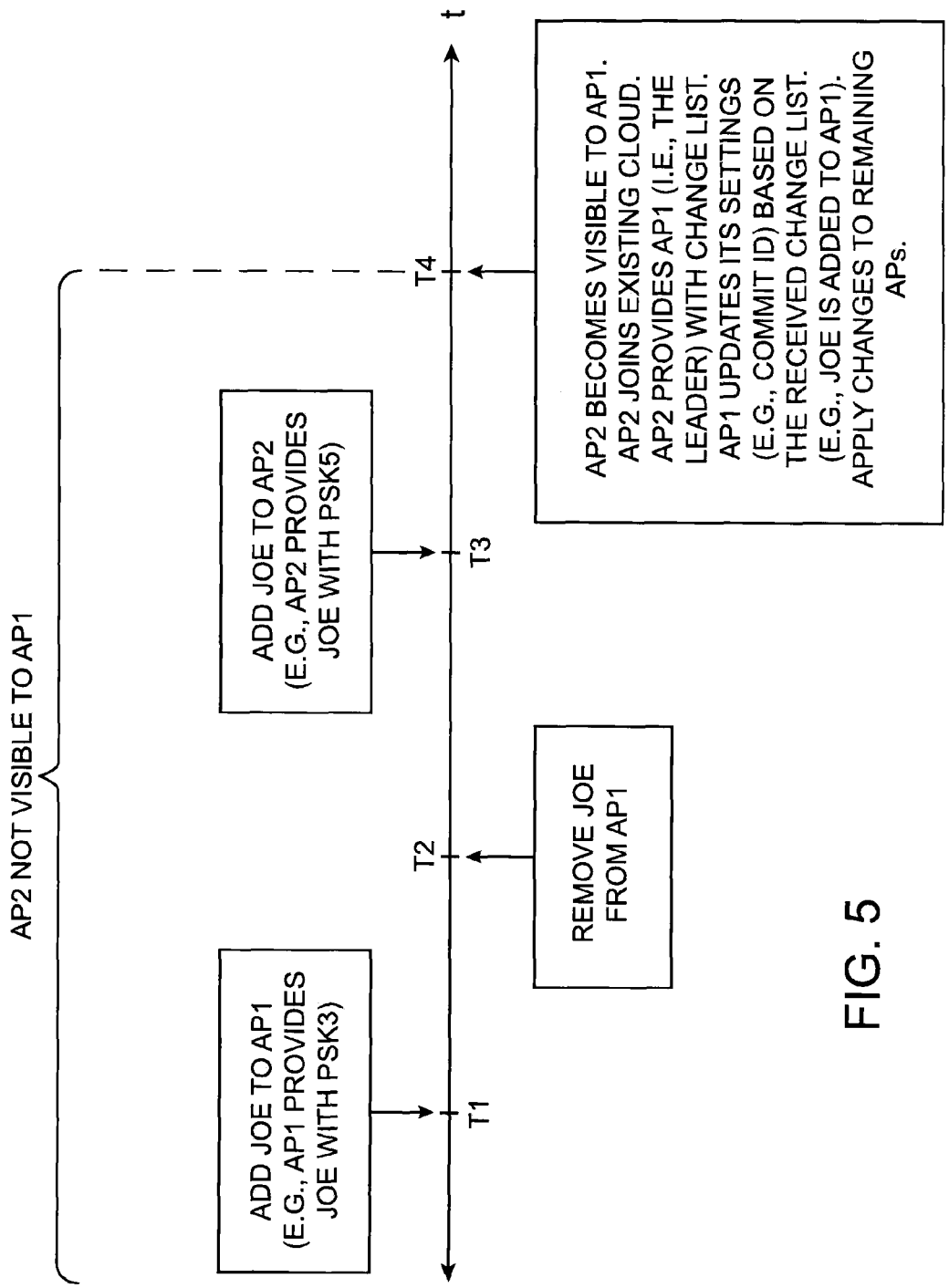
FIG. 5 is a timeline showing an illustrative sequence of events that can occur when adding an access point to a wireless network in accordance with an embodiment of the present invention.

Change lists may also be used in scenarios involving multiple access points. Consider a second scenario in which there are two access points (e.g., AP1 and AP2) maintained by a user. The second scenario is an example showing synchronization of two access points that have different settings and are being brought together to form a single cloud. FIG. 5 illustrates a timeline showing a sequence of settings that can be applied to AP1 and AP2. Initially, access points AP1 and AP2 are not in communications with each other. For example, a user may have set up a home network using access point AP1 and may have set up an office network using access point AP2. In this type of situation, access points AP1 and AP2 may, at least initially, be remote from each other (e.g., miles apart).

While access points AP1 and AP2 are separated, a user may, at time T1, adds Joe as an authorized user to AP1. When Joe joins AP1, AP1 may assign Joe a key such as PSK3. At T2, the user may decide that Joe should no longer be authorized at access point AP1. The user may therefore remove Joe from AP1. In response, AP1 may deauthorize key PSK3 or take other actions to prevent Joe from accessing access point AP1 using PSK3. AP1 may have a first change list that records the changes to AP1 that occurred at T1 and T2.

At T3, the user may add Joe to AP2. AP2 may have the same cloud ID (e.g., SSID1) as AP1. When Joe joins AP2, AP2 may assign Joe a different key such as PSK5 that is associated with AP2. AP2 may have a second change list that records the changes to AP2 that occurred at T3.

It is important to note that at T3, AP2 is not yet visible to AP1 (e.g., the wireless capabilities of AP2 are not yet enabled or the AP2 is beyond the wireless range of AP1 in this scenario). If AP1 and AP2 cannot see each other via their network management services, the two access points will not be synchronized and will operate autonomously.

At T4, access point AP2 may become visible to access point AP1. For example, the user may bring access point AP2 within range of AP1. The user may, as an example, have decided that access point AP2 is no longer needed at the office, but could be valuable in expanding wireless coverage as part of the user's home network.

When the user brings access point AP2 within range of access point AP1, access points AP1 and AP2 may wirelessly communicate and synchronize settings. Because access points AP1 and AP2 have the same cloud IDs, access points AP1 and AP2 may join together to form a single cloud. Access points AP1 and AP2 may have first and second participant IDs, respectively. The first participant ID may be less than the second participant ID (as an example). AP1 may therefore be elected as the leader of the cloud that is formed from access points AP1 and AP2.

When AP2 merges in a cloud with AP1, AP2 may check its commit ID with the commit ID of the leader (i.e., AP1). The current wireless access control settings of AP2 may not be the same as the wireless access control settings of AP1 (e.g., Joe has been added to AP2, but Joe was previously deleted from AP1). In this scenario, AP2 will provide the second change list to AP1. AP1 may update its wireless access control settings and commit ID based on the received change list. If multiple devices try to change the same value, the access points may use the timestamp information in the change list to resolve the conflict. For example, the access points can allow the most recent changes to prevail (i.e., the change to a setting with the latest UTC timestamp prevails over previous changes to the same setting). If the timestamps are identical, the participant with the smallest participant ID wins. Because the addition of Joe to AP2 has a later timestamp (T3) than the removal of Joe at AP2 (T2), Joe may be automatically added to AP1 (e.g., AP2 may provide key PSK5 to AP1 as part of the synchronization process). All participants within a cloud may be synchronized in this way whenever their commit IDs are different from the leader of the cloud.

Credential sharing (changes to data 32 of FIG. 3) may, if desired, be treated differently than user configuration changes. It may be desirable to retain credential sharing settings so that the keys may be shared among multiple access points in a cloud. For example, if Joe were not removed in the second scenario above, PSK3 would not have been removed from Joe. As a result, when AP1 and AP2 join to form a cloud, PSK3 and PSK5 would both remain intact.

A client device may roam within the cloud because other access points have acquired the key of the client device during cloud joining. However, in the event that the user deletes an entire client entry, the client may be entirely removed from the cloud (e.g., access discontinued and all PSKs associated with that client are deleted from the cloud).

The updated commit ID of the leader may match the commit ID of AP2 after the change has been applied. If there are additional non-leader participants in the cloud, the non-leader participants will update their settings accordingly to match the leader's most up-to-date wireless configuration.

When a participant that is already on a network wishes to synchronize a change to its user configuration with other participants, it must push the change to the leader. The leader may then make the appropriate changes to its internal change list. The leader may then respond to the participant with the latest complete change list. The participant may then apply the latest complete change list from the leader to its internal change list. The commit IDs of the leader and the participant should be updated and matched after a complete synchronization process. In the event that the changes originated from the leader, each participant may then be notified of the change (e.g., by detecting that their commit IDs no longer match the commit ID of the leader) and may take turns pulling the change from the leader.

In a scenario in which a single cloud instance is split into multiple instance (e.g., wireless connectivity is lost between the access points for whatever reason), each side of the split will elect a new leader and continue to operate normally with the changes that were present immediately before the split. Any new changes within each cloud instance will be tracked by the internal change list within that instance. The cloud may be rejoined in the future if connectivity resumes. When the cloud rejoins, the leader of the joined cloud will again sort out the change list and update the changes accordingly.

The synchronization process may be an ongoing process. Cloud synchronization operations may be performed whenever a new participant joins a network or when a change is desired in any participant in a cloud.

Figure 6:
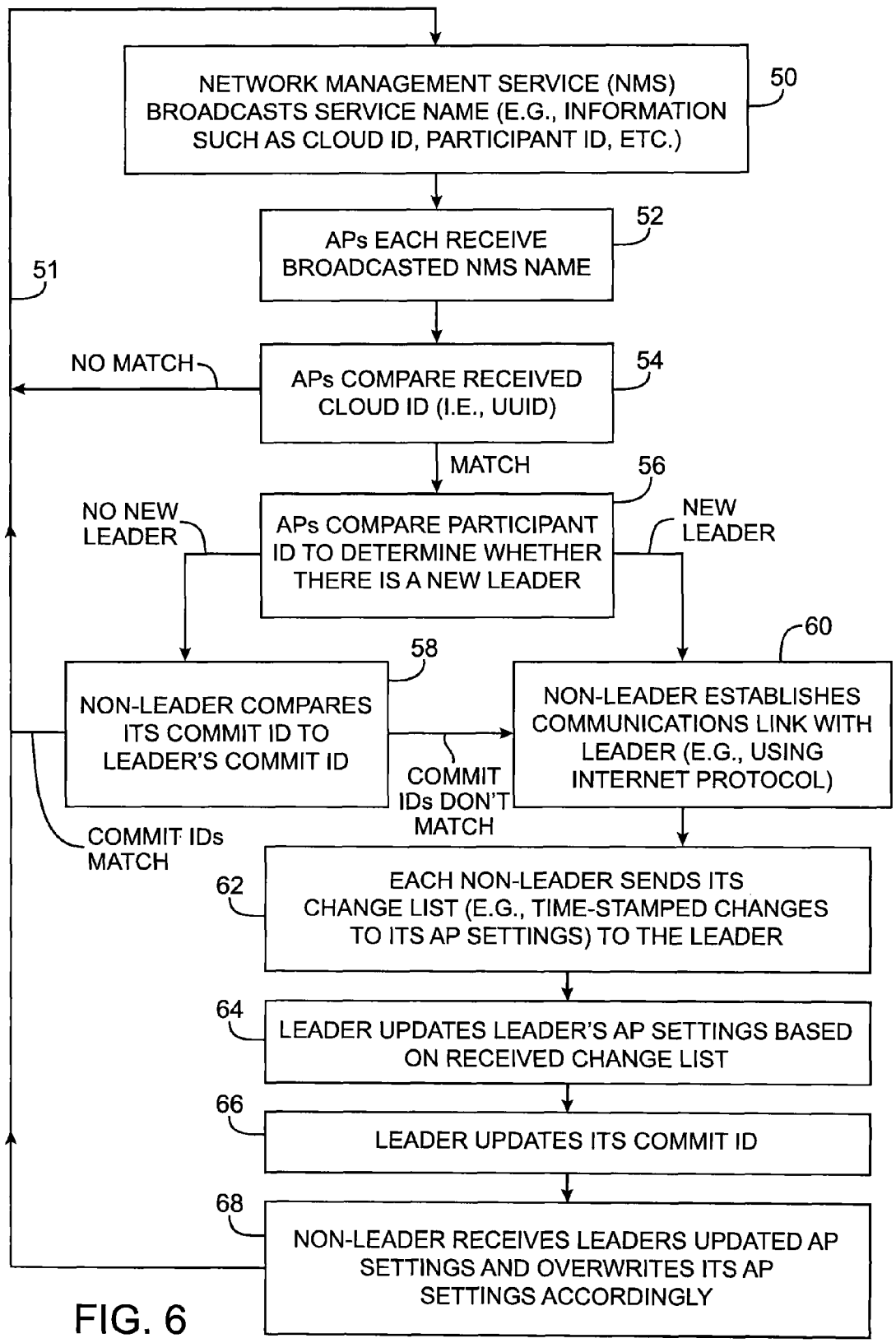
FIG. 6 is a flow chart of illustrative steps involve in configuring a wireless network that may have a time-varying number of access points in accordance with an embodiment of the present invention.

FIG. 6 is a flow chart of illustrative steps involved in automatically synchronizing settings among the access points in wireless local area network 11. At step 50, each access point participant may be running a network management service (e.g., software running on the access point hardware that implements a service discovery protocol). The network management service on each access point may be used by that access point to broadcast its service name. The service name may include information such as a cloud ID (e.g., a cloud UUID formed from a cloud SSID) and participant ID (e.g., a participant UUID). Each access point that is in wireless communications with the other access points may receive these broadcasted service names (step 52).

When an access point receives a service name, it compares its cloud ID to the cloud ID provided by the received service name (step 54). If the cloud IDs do not match, the access points are not part of the same cloud, so operations may loop back to step 50, as indicated by path 51.

If the cloud IDs do match, the access points may compare their participant IDs to determine whether there is a new leader (step 56). If there is a new leader (e.g., a new participant has joined and the new participant has the smallest participant ID), the network management service that is running on the access points can conclude that synchronization operations are needed. The non-leader participants may therefore each establish a communications link with the new leader at step 60. The link that is established during the operations of step 60 may be an internet protocol (IP) link such as a transmission control protocol (TCP) link or user datagram protocol (UDP) link. If there is no new leader, the non-leaders compare their commit IDs to the leader's commit ID (step 58).

If the comparison operations of step 58 indicate that the commit IDs match, no new settings have been made, so processing may loop back to step 50, as indicated by path 51. If the comparison operations of step reveal that the commit IDs do not match, processing may continue at step 60. The operations of step 60 may be performed if a non-leader needs to maintain communication with the leader or the operations of step 60 may be bypassed if the non-leader has recently established connection with the leader.

Following completion of step 60, each non-leader may send its change list to the leader (step 62). This change notification process may be performed using the network management service. The change list may include a list of wireless access control settings and time-stamped changes that have been recorded by each participant (see, e.g., wireless access control settings 28 of FIG. 3).

At step 64, the leader may gather a change list received from any of its non-leader participants that are part of the same cloud. The leader may make the appropriate changes to its internal wireless access control settings (e.g., the leader may add or delete PSKs of participants that are current added or removed from other access points). The leader will resolve conflicts presented by the list of changes based on the timestamps provided in the received change list. For example, the most recent changes to the settings may prevail over older changes (see, for example, the example of FIG. 5).

At step 66, the leader may update its commit ID to reflect the most up-to-date changes. For example, the leader may hash its updated wireless access control settings (settings 28 of FIG. 3) to produce the updated commit ID. A hash function is a one way function, so the output of a hash function cannot be reversed (i.e., the input to the hash function cannot be obtained from its output). The use of a hashed version of the wireless access control settings as the commit ID therefore ensures that the wireless access control settings will not be inadvertently revealed to unauthorized parties.

Once the leader has updated its wireless settings, the leader may provide these settings to the other access points. In particular, the leader may push its current wireless settings onto all of the non-leader participants at step 68. During the operations of step 68, each non-leader participant may take a turn communicating with the leader and may overwrite its internal wireless access control settings with the wireless settings provided from the leader. Access points with new settings may compute updated commit IDs. For example, during the operations of step 68, each access point that receives new wireless access control settings may recompute its commit ID (e.g., by applying a hash function to the new wireless access control settings). Updates to commit IDs may also be made following changes to these settings (e.g., whenever a user performs a set to add an authorized client device, whenever a user performs a remove to delete a client device, after a reset operation to reset the wireless access control settings of an access point, etc.). Changes made to access point settings may be detected during the commit ID comparison operations of step 58.

Following the operations of step 68, every participant in the cloud will be synchronized and will have identical wireless access control settings 28. Each participant will also share a common commit ID. The cloud will remain synchronized until a change to the wireless access control settings of a participant is made or until the network exhibits other changes (e.g., an access point is brought into range of network 11 or is taken out of range of network 11). After step 68, processing may loop back to step 50, as indicated by path 51. If desired, each participant may delay a random number of seconds (e.g., 1-3 seconds) before repeating the process at step 50.

A user may generally make changes at any suitable time during the operations of FIG. 6. The changes a user makes to the wireless access control settings of a given access point are reflected in a new commit ID value for that access point. This change may be detected during the comparison operations of step 58. Changes a user makes to the network by removing or adding access points may result in changes that are detected at step 56 (e.g., when a new leader is introduced) or at step 58 (e.g., when discrepancies between the settings of an access point and a new access point are detected).

The foregoing is merely illustrative of the principles of this invention and various modifications can be made by those skilled in the art without departing from the scope and spirit of the invention.

What is claimed is:

1. A method of managing one or more access points (APs) in a wireless network, comprising:
   detecting, at a first access point (AP) associated with a first cloud of the wireless network, a second AP that is associated with a second cloud of the wireless network and is within wireless range of the first AP;
   determining that the second AP can be associated with the first cloud;
   merging the second AP into the first cloud;
   electing an AP leader, wherein the electing the AP leader comprises:
      comparing, at the first AP, a first AP participant identifier associated with the first AP to a second AP participant identifier of the second AP, the first AP participant ID uniquely identifying the first AP and the second AP participant ID uniquely identifying the second AP in the wireless network; and
      determining from the comparison of the first and second AP participant identifiers that a new AP leader is present in the first cloud; and
      selecting the second AP as the new AP leader, wherein the first AP was a previous AP leader prior to the merging the second AP into the first cloud; and
   transmitting wireless access control settings of the first AP from the first AP to the second AP to allow other APs to report and synchronize changes of associated wireless access control settings with the second AP.

2. A method for managing one or more access points in a wireless network, comprising:
   detecting, at a first access point (AP) associated with a first cloud of the wireless network, a second AP that is associated with a second cloud of the wireless network, wherein a credential enables a wireless client to connect to the second AP but not the first AP; and
   responsive to determining that the second AP can be associated with the first cloud:
      merging the second AP into the first cloud, wherein the merging the second AP comprises electing one of the first AP and the second AP as an AP leader of the first cloud to allow other APs in the first cloud to report and synchronize changes of associated wireless access control settings with the AP leader;
      configuring the first AP with the credential to enable the wireless client to connect to the first AP using the credential;
   wherein if the second AP cannot be associated with the first cloud, the second AP continues to be associated with the second cloud.

3. The method defined in claim 2, further comprising:
   establishing a communications link between the first AP and the second AP in response to detecting the second AP.

4. The method defined in claim 2, wherein the credential comprises a network access key.

5. The method defined in claim 2, wherein detecting the second AP comprises receiving a service name that is wirelessly broadcasted by the second AP.

6. The method defined in claim 5, wherein the first cloud is uniquely identified by a first cloud ID; and
   wherein the determining that the second AP can be associated with the first cloud comprises determining that the service name contains the first cloud ID.

7. The method defined in claim 2, wherein the wireless client obtains the credential by performing an enrollment procedure with the second AP.

8. The method defined in claim 7, wherein the enrollment procedure uses the Wi-Fi Protected Setup (WPS) protocol.

9. The method defined in claim 2, wherein:
   the first AP is uniquely identified by a first participant ID; and
   the second AP is uniquely identified by a second participant ID.

10. The method defined in claim 9, wherein the merging the second AP into the first cloud comprises:
    communicating with the second AP to elect the first AP as the AP leader of the first cloud;
    receiving wireless access control settings from the second AP;
    updating the first AP's wireless access control settings with the received wireless access control settings from the second AP; and
    pushing the updated access control settings to the other APs, other than the second AP, in the first cloud.

11. The method defined in claim 10, wherein the communicating with the second AP to elect the first AP as the AP leader of the first cloud comprises determining that the first participant ID of the first AP is smaller than the second participant ID of the second AP.

12. The method defined in claim 2, wherein:
    the wireless network is a Wi-Fi network;
    the first AP and the second AP are Wi-Fi access points; and
    the first cloud is identified by a unique service set identifier (SSID).

13. The method defined in claim 2, wherein the associated wireless access control settings for each AP in the first cloud comprise at least one of:
    timestamp information;
    one or more user configuration settings;
    one or more times access settings that correspond to settings on permitted times for wireless access using any AP that belongs to the first cloud; and
    one or more credentials.

14. A machine readable non-transitory storage medium containing executable software which when executed by a wireless access point causes the wireless access point to perform a method for managing one or more access points in a wireless network, comprising:
    detecting, at a first access point (AP) associated with a first cloud of the wireless network, a second AP that is associated with a second cloud of the wireless network and is within wireless range of the first AP, wherein a credential enables a wireless client to connect to the second AP but not the first AP;
    responsive to determining that the second AP can be associated with the first cloud:
       merging the second AP into the first cloud, wherein merging the second AP into the first cloud comprises electing one of the first AP and the second AP as an AP leader of the first cloud to allow other APs in the first cloud to report and synchronize changes of associated wireless access control settings with the AP leader;
       configuring the first AP with the credential to enable the wireless client to connect to the first AP using the credential;
    wherein if the second AP cannot be associated with the first cloud, the second AP continues to be associated with the second cloud.

15. The medium defined in claim 14, wherein the detecting the second AP comprises receiving a service name that is wirelessly broadcasted by the second AP.

16. The medium defined in claim 15, wherein the first cloud is uniquely identified by a first cloud ID; and
wherein the determining that the second AP can be associated with the first cloud comprises determining whether the service name contains the first cloud ID.

17. The medium defined in claim 14, wherein the wireless client obtains the credential by performing an enrollment procedure with the second AP.

18. The medium defined in claim 17, wherein the enrollment procedure uses the Wi-Fi Protected Setup (WPS) protocol.

19. The medium defined in claim 14, wherein:
the first AP is uniquely identified by a first participant ID; and
the second AP is uniquely identified by a second participant ID.

20. The medium defined in 19, wherein the merging the second AP into the first cloud comprises:
communicating with the second AP to elect the first AP as the AP leader of the first cloud;
receiving wireless access control settings from the second AP;
updating the first AP's wireless access control settings with the received wireless access control settings; and
pushing the updated access control settings to the other APs, other than the second AP, in the first cloud.

21. The medium defined in claim 20, wherein the communicating with the second AP to elect the first AP as the AP leader of the first cloud comprises determining that the first participant ID of the first AP is smaller than the second participant ID of the second AP.

22. The medium defined in claim 14, wherein:
the wireless network is a Wi-Fi network;
the first AP and the second AP are Wi-Fi access points; and
the first cloud is identified by a unique service set identifier (SSID).

23. An access point, comprising:
a processor; and
a memory coupled to the processor for storing instructions, which when executed by the processor, cause the processor to:
detect, at the access point (AP), which operates as part of a first cloud of the wireless network, a second AP that operates as part of a second cloud of the wireless network and within wireless range of the AP,
wherein a credential enables a wireless client to connect to the second AP but not the AP;
responsive to determining that the second AP can merge into the first cloud:
merge the second AP into the first cloud, wherein the merging the second AP comprises electing one of the first AP and the second AP as an AP leader of the first cloud to allow other APs in the first cloud to report and synchronize changes of associated wireless access control settings with the AP leader; and;
configure the AP with the credential to enable the wireless client to connect to the AP using the credential;
wherein if the second AP cannot merge into the first cloud, the second AP continues to operate as part of the second cloud.

24. The access point of claim 23, wherein the processor is further configured to:
establish a communications link between the AP and the second AP in response to detecting the second AP.

25. The access point of claim 23, wherein the credential comprises a network access key.

26. The access point of claim 23, wherein the detecting the second AP comprises receiving a service name that is wirelessly broadcasted by the second AP.

27. The access point of claim 26, wherein the first cloud is uniquely identified by a first cloud ID; and
the determining whether the second AP can be associated with the first cloud comprises determining whether the service name contains the first cloud ID.

28. The access point of claim 23, wherein the wireless client obtained the credential by performing an enrollment procedure with the second AP.

29. The access point of claim 23, wherein:
the AP is uniquely identified by a first participant ID;
the second AP is uniquely identified by a second participant ID.

30. The access point of claim 29, wherein the merging the second AP into the first cloud comprises:
communicating with the second AP to elect the first AP as the AP leader of the first cloud;
receiving wireless access control settings from the second AP;
updating the first AP's wireless access control settings with the received wireless access control settings; and
pushing the updated access control settings to the other APs, other than the second AP, in the first cloud.

31. The access point of claim 30, wherein the communicating with the second AP to elect the first AP as the AP leader of the first cloud comprises determining that the first participant ID of the first AP is smaller than the second participant ID of the second AP.

32. The access point of claim 23, wherein:
the wireless network is a Wi-Fi network;
the first AP and the second AP are Wi-Fi access points; and
the first cloud is identified by a unique service set identifier (SSID).

33. The access point of claim 23, wherein the associated wireless access control settings for each AP that belongs to the first cloud comprise at least one of:
timestamp information;
one or more user configuration settings;
one or more times access settings that correspond to settings on permitted times for wireless access using any AP in the first cloud; and
one or more credentials.

34. A method for managing one or more access points in a wireless network, comprising:
detecting, at a first access point (AP) associated with a first cloud of the wireless network, a second AP that is associated with a second cloud of the wireless network and is within wireless range of the first AP, wherein a credential enables a wireless client to connect to the second AP but not the first AP, and
wherein:
the first cloud is uniquely identified by a first cloud ID;
the first AP is uniquely identified by a first participant ID; and
the second AP is uniquely identified by a second participant ID;
determining that the second AP can be associated with the first cloud by determining whether a service name broadcasted by the second AP contains the first cloud ID;
responsive to determining that the second AP can be associated with the first cloud:
communicating with the second AP to elect the first AP as the AP leader of the first cloud by determining that the first participant ID of the first AP is smaller than the second participant ID of the second AP;
receiving wireless access control settings from the second AP;
updating the first AP's wireless access control settings with the received wireless access control settings; and
pushing the updated access control settings to other APs, other than the second AP, in the first cloud;
allowing the wireless client to connect to the first AP using the credential;
wherein if the second AP cannot be associated with the first cloud, the second AP continues to be associated with the second cloud.

* * * * *